United States Patent [19]

Merrell et al.

[11] 4,194,195
[45] Mar. 18, 1980

[54] PORTABLE LIQUID LEVEL MAINTENANCE MONITOR SYSTEM FOR VEHICLES

[75] Inventors: Kenneth C. Merrell, Brea; James H. Koegel, Placentia, both of Calif.

[73] Assignee: Robertshaw Controls Company, Richmond, Va.

[21] Appl. No.: 872,898

[22] Filed: Feb. 27, 1978

[51] Int. Cl.² ............................................. B60T 8/00
[52] U.S. Cl. ................................. 340/661; 340/52 F; 340/507
[58] Field of Search ...................... 340/661, 52 F, 507

[56] References Cited

U.S. PATENT DOCUMENTS

| | | | |
|---|---|---|---|
| 3,811,051 | 5/1974 | Merrell | 340/624 |
| 3,979,657 | 9/1976 | Yorksie | 340/661 |
| 4,007,456 | 2/1977 | Paige et al. | 340/507 |
| 4,109,234 | 8/1978 | Davis | 340/661 |

Primary Examiner—Glen R. Swann, III
Attorney, Agent, or Firm—Fulwider, Patton, Rieber, Lee & Utecht

[57] ABSTRACT

A monitoring circuit for monitoring a plurality of signals developed by remote sensors which preferably are capacitance probe sensors. The circuit is intended for use with a motor vehicle maintenance system employing capacitance probes to detect low and safe levels of oils and coolants in a vehicle engine. The monitoring circuit includes a constant voltage source with a voltage divider in circuit therewith to develop a plurality of reference voltage signals of predetermined values which are applied to respective inputs of a plurality of voltage comparators that receive, at their other terminals, condition-responsive voltage signals generated by a condition sensing circuit. The condition sensing circuit comprises a liquid level capacitance probe which generates intermediate, high and low voltage signals indicative of safe and low, respectively, levels of sense liquid. Open or shorted leads in the sensing circuit generate zero and maximum voltages, respectively, which are also applied to comparator circuits, whose outputs activate visible indicators to register safe and unsafe liquid level, and shorted or open sensing circuits.

10 Claims, 3 Drawing Figures

PORTABLE LIQUID LEVEL MAINTENANCE MONITOR SYSTEM FOR VEHICLES

BACKGROUND OF THE INVENTION

1. Field of Invention

This invention relates to a monitoring circuit and, in particular, to a monitoring circuit for motor vehicle maintenance.

2. Background of the Prior Art

The increased consumer awareness and the increasing concern for safety of products such as automobiles has resulted in the development of various monitoring circuits to detect any potentially hazardous condition. The development of these circuits has also been spurred by the desire to increase the efficiency of routine inspections and maintenance of vehicles.

Examples of recent patents on automotive monitoring systems are U.S. Pat. Nos. 3,852,712 and 3,894,108. The first of these patents employs an indicator drum which bears a plurality of legends identifying the particular, sensed parameter with a warning light to indicate a hazardous condition. The second of these patents discloses a monitoring circuit in which signals from a plurality of vehicle condition sensors are passed into a trip circuit to activate alarm devices.

One of the failings of the prior devices is the failure to monitor their internal circuitry such that an indicator or alarm is activated to warn the user of malfunction of the circuit resulting from an open or shorted circuit lead. Additionally, it is desirable to provide a monitoring circuit which employs a minimum number of discrete components which preferably are obtainable in commercially available integrated circuits. The system should also preferably employ its own battery, independent of the vehicle battery and, for simplification, should comprise a single wire system, utilizing the vehicle chassis for the common ground.

BRIEF DESCRIPTION OF THE INVENTION

This invention comprises a monitoring circuit which includes a constant voltage source with a voltage divider in circuit therewith to develop a plurality of reference voltage signals of distinct and predetermined values which are applied to the inputs of a plurality of voltage comparators which receive, at their other terminals, condition-responsive voltage signals generated by each of a plurality of condition sensor circuits. The reference voltages bias the comparators at predetermined values such that the comparators develop an output signal at predetermined sensor voltages. The comparator output signals are applied to indicator means, preferably light emitting diodes, that are employed as the visual alarm means. The sensor circuit is a capacitance responsive circuit in which reference and measurement capacitors are charged with a constant current and the voltages developed on the capacitors are applied to voltage comparator means that is operative to bias a switching transistor in a resistive voltage divider circuit to generate current signals of predetermined magnitude in response to the switching of the transistor. The resultant current signals are applied to the monitor inputs to provide a voltage signal across a fixed resistor to be monitored by the comparator means.

BRIEF DESCRIPTION OF THE DRAWINGS

The invention will be described with reference to the illustrations of which.

DESCRIPTION OF PREFERRED EMBODIMENT

Figure 1:
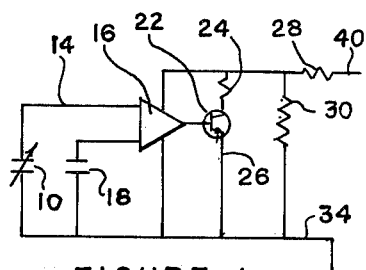
FIG. 1 is an electrical schematic of a sensing circuit.

Referring now to FIG. 1, the sensor circuit is illustrated as including a capacitance probe 10 having a probe rod 12 (FIG. 3) which is immersed in the liquid under test and which produces a change in electrical capacitance when the liquid displaces the air immediately surrounding the probe rod. In the preferred embodiment, the probe unit 10 includes a capacitance detector circuit which is included in the probe unit such as the commercially available Mini-Tek liquid level detectors which are marketed by Robertshaw Controls Company, Anaheim, California. The capacitance detection circuit included in these probe units is that described in U.S. Pat. No. 3,811,051, which is incorporated herein by reference.

Briefly, the aforementioned capacitance probes and circuits function to convert the electrical capacitance charge of the probe unit to a bi-stable electrical current signal developing a low electrical current signal when liquid surrounds the probe rod and a higher current signal when the liquid is absent or the probe rod is at a low immersion within the liquid. The operation of the aforementioned circuit is described briefly with reference to FIG. 1 wherein the probe capacitance is connected to input 14 of capacitance comparator 16 and a reference or constant value capacitor 18 is connected to the other input 20 of capacitance comparator 16. The probe capacitor and the reference capacitor 18 are charged by current supply internal to the comparator 16 and develop a voltage ramp which is characteristic of their capacitance value. The developed voltage ramps are compared by a voltage comparator within the capacitance comparator 16. If the capacitance of the probe is less than the capacitance of the standard capacitor 18, the charging rate of the probe capacitor will exceed that of the reference capacitor 18 and a voltage comparator within produces a negative output signal which will forward bias the transistor 22, permitting current flow through resistor 24. Transistor 22 thus functions as a switch in the resistive leg 26 of the voltage divider circuit of resistors 24, 28 and 30. When the liquid level is at a safe or high immersion of the probe rod 12, the capacitance of the probe unit 10 exceeds that of the reference capacitor and has a lesser charging rate. This results in a positive output signal which applied to transistor 26 biases the latter into a nonconducting mode such that the voltage signal developed between output lead 32 and the common ground 34 is a constant predetermined value determined by the value of resistors 28 and 30.

Figure 2:
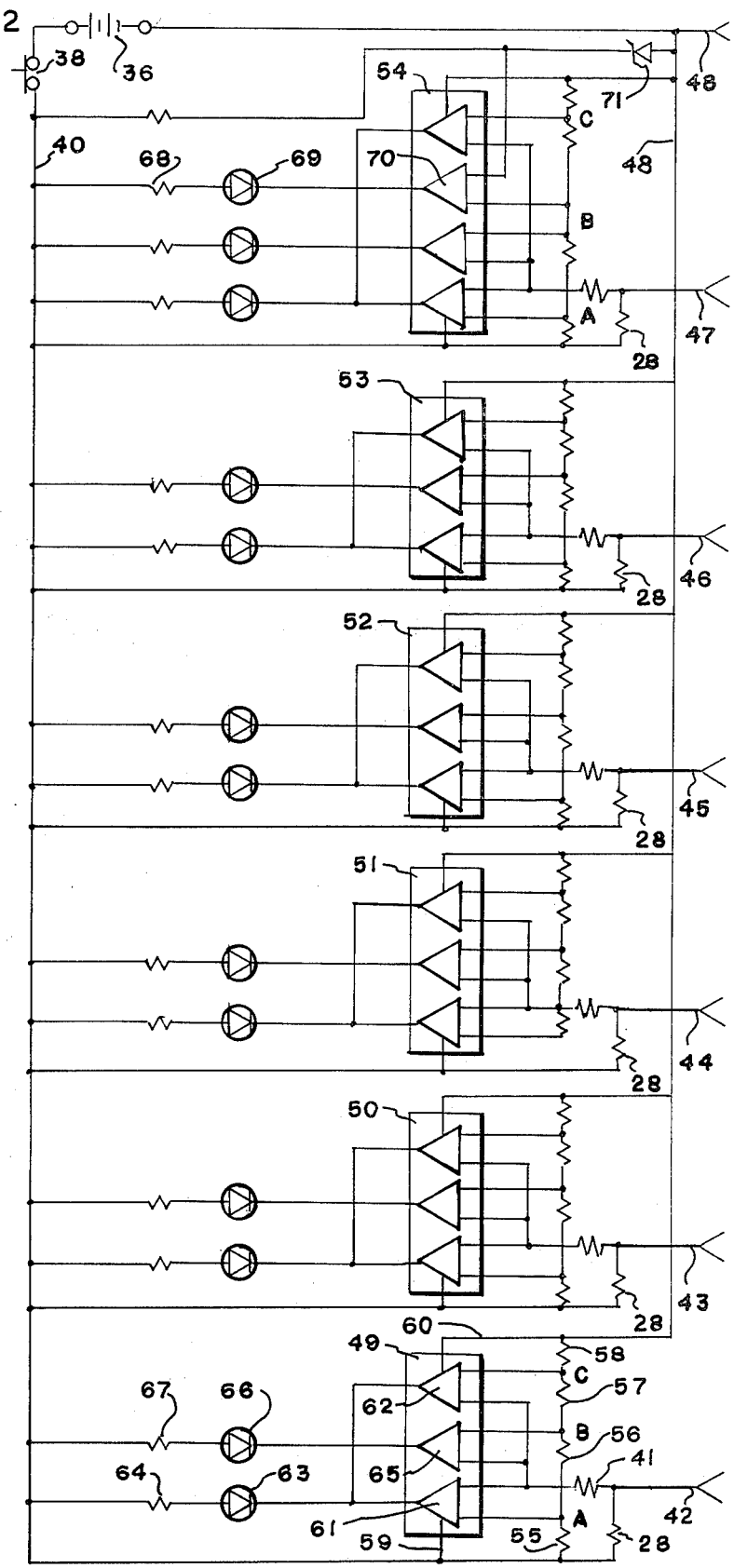
FIG. 2 is an electrical schematic of the monitoring circuit of the invention.

Referring now to FIG. 2, the monitoring circuit of the invention will be described. As there illustrated, the circuit comprises a battery 36 which is connected through operating switch 38 to the positive bus 40 and negative or ground bus 48. The circuit as there illustrated is intended for monitoring of six independent sensor elements such as capacitance probe unit 10 shown in FIG. 1. Each of the six inputs are received at input terminals 42-47. Input terminal 48 connects the circuit to the common or vehicle chassis ground.

Each remote sensor is connected through three differential amplifiers of integrated circuits 49-54. The load resistor 28 described in FIG. 1 is shown for each of these individual sensor circuits. Resistors 55-58 form a voltage divider circuit for developing the desired reference or bias voltages for the inputs to the respective differential amplifiers. Leads 59 and 60 provide the operational voltages for the differential amplifiers. The outputs of differential amplifiers 61 and 62 are connected together to diode 63 and current limiting resistor 64 while the output of differential amplifier 65 is connected through diode 66 and limiting resistor 67 to the positive bus 40 of the circuit.

The voltage divider network of resistors 55-58 provides a plurality of reference voltages which are designated as A, B and C in the illustration. In the preferred embodiment, these voltages are, respectively, 1.2, 2.9 and 10.8 volts with reference to the positive bus 40. The reference voltages are applied to the noninverting terminals of differential amplifiers 61 and 65 and to the inverting terminal of amplifier 62. The input sensor voltage applied at terminal 42 is applied to the inverting terminals of amplifiers 61 and 65 and to the noninverting terminal of amplifier 62.

The preferred embodiment utilizes resistors in the divider network of FIG. 1 such that the voltages set forth in the following table are developed at the indicated conditions:

TABLE 1

| Condition | Voltage Drop (28) |
|---|---|
| Safe level | 3.87 v |
| Low level | 2.04 v |
| Shorted lead | 12 v |
| Open lead | 0 v |

These voltages, developed across resistors 28, are applied to the aforementioned input terminals of the differential amplifiers. At the safe operating level, the sensor input voltage is 3.87 volts. Since this voltage is more positive than the input voltages of 1.2 and 2.9 volts to amplifiers 61 and 65, the output of the amplifiers remains positive and no current is conducted through the light emitting diode diodes 63 and 66. Similarly, since this voltage is less than the 10.8 volts reference voltage supplied to the inverting terminal of amplifier 62, the output of this amplifier remains positive and no current is conducted through light emitting diode 63. The following Table 2 summarizes the operational condition of amplifiers 61, 65 and 62 and of the light emitting diodes 63 and 66:

TABLE 2

| | AMPLIFIER OUTPUT | | | FAULT | ALARM |
|---|---|---|---|---|---|
| Condition | 61 | 65 | 62 | LED-63 | LED-66 |
| Safe level | off | off | off | off | off |
| Low level | off | on | off | off | on |
| Shorted lead | off | off | on | on | off |
| Open lead | on | on | off | on | on |

At a low level, the voltage drop across resistor 28 is 2.04 volts. Since this voltage is greater than the reference voltage to amplifier 61, the output of this amplifier remains positive and no current flows through diode 63. Similarly, the voltage drop of 2.04 volts is less than the 10.8 reference voltage to the inverting terminal of amplifier 62 and the output of this amplifier remains positive and no current flows through diode 63. The input voltage of 2.04 volts supplied to amplifier 65 causes its output to go negative, permitting current flow through resistor 67 and light emitting diode 66, the alarm indicator.

In the event that the sensor or monitoring circuit develops a shorted lead, the voltage drop across resistor 28 is the supply voltage of 12 volts. Since this voltage exceeds the reference voltages of 1.2 and 2.9 volts supplied to amplifiers 61 and 65 respectively, the output of these amplifiers is positive and these amplifiers remain in a nonconducting state. The 12 volt drop across resistor 28, however, develops sufficient voltage which when applied to the noninverting terminal of amplifier 62 causes the output of this amplifier to go negative and current is conducted through resistor 64 and diode 63 indicating a fault in the control circuit.

In the event of an open lead, which results in no current flow and no voltage drop across resistor 28, the input voltage to amplifiers 61 and 65 is less than the respective reference voltages and the output of both of these amplifiers goes negative resulting in current flow through diodes 63 and 66, indicating both a fault and alarm condition.

The aforedescribed operation thereby provides an indication of four different conditions which are: the monitoring of the safe and low or hazardous level of the liquid, and the inspection or monitoring of the electrical circuits such that defects in the circuit which would give anomalous results do not go undetected by the operator.

The integrated circuits 49-54 employed for the monitoring circuit are four-function, differential amplifier integrated circuits. The fourth function is utilized with integrated circuit 54 by connecting this fourth differential amplifier 70 through resistor 68 and diode 69 to the positive bus 40. Reference voltage D of 6.2 volts with respect to ground, derived from zener diode 71 is supplied to the non-inverting terminal of amplifier 70 which also receives divider voltage B of 9.1 volts, with respect to ground. When the battery voltage is above 8.2 volts, the divider voltage will be above 6.2 volts and this reliable state is indicated by the output of amplifier 70 going negative and with current being conducted through diode 69. When the battery voltage is below 8.2 volts LED 69 (battery OK light) will fail to illuminate when the battery on button is pressed.

The following table identifies the elements used in the presently preferred embodiment.

TABLE 3

| Element | Identity | Value |
|---|---|---|
| 10, 16, 22 | Mini-Tek capacitance probe | — |
| 24 | Resistor | 5.1 K |
| 28 | Resistor | 300 ohms |
| 30 | Resistor | 1.6 K |
| 41 | Resistor | 10 K |
| 49-54 | Integrated Circuit | LM 339N |
| 55 | Resistor | 10 K |
| 56 | Resistor | 15 K |
| 57 | Resistor | 68.1 K |
| 58 | Resistor | 10 K |
| 63 | Light emitting diode | MV5021 |
| 64, 67 | Resistor | 1 K |
| 66 | Light emitting diode | MV5021 |
| 68 | Resistor | 1 K |
| 69 | Light emitting diode | MV5021 |
| 71 | Zener diode | 1N752A |

Figure 3:
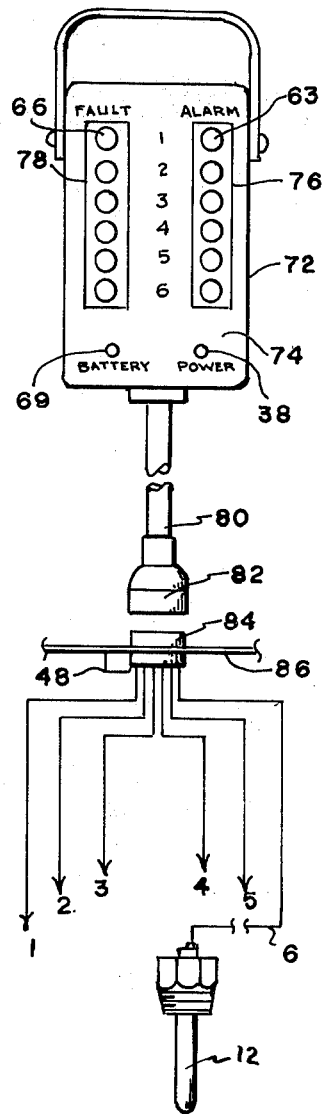
FIG. 3 is an llustration of the monitoring test meter of the invention.

Referring now to FIG. 3, the monitoring circuit is contained within housing 72 having a front panel 74 with two vertical rows of light emitting diodes. The alarm row 76 has a light emitting diode 63 for each of the sensors identified as elements 1 through 6 on the front panel. The fault row 78 of light emitting diodes 66 is similarly identified by its respective sensor. The switch 38 to activate the monitoring circuit is identified with a power button, and light emitting diode 69, which indicates a safe battery condition, also appears on the front panel.

The meter has a cable 80 with a connector plug 82 that is attached to connector 84 which is secured to the vehicle frame by a mounting bracket 86. The connector plug has individual leads 1 through 6 which connect to the respective terminals of the six remote sensors which can be installed in the vehicle to monitor items such as coolant level, crankcase oil level, transmission oil level, differential oil level, hydraulic oil reservoir level, water in fuel, or various combinations of these items.

The operation of the monitoring device is relatively simple. The device can be inspected for proper operation of the LEDS by depressing the power button with the cable disconnected from the vehicle. All of the LEDs must light up under this condition. The plug is then connected to the vehicle and the power on button is depressed and the battery LED 69 should light up indicating that the monitoring circuit batteries 36 have the proper voltage for operation of the circuit. If any of the level alarm diodes 63 light up this is an indication of unsafe liquid level for the respective remote sensor. If any of the fault LEDs light up, this indicates that the wire connecting to the sensor is shorted to the vehicle chassis. In the event that the fault LED and alarm LED for the same remote sensor light up, this indicates that the wire extending to the remote sensor has broken. In the event that neither the fault or the alarm LED lights up for the respective sensor, this indicates that the monitored condition is safe.

The invention has been described with reference to the illustrated and presently preferred embodiment. It is not intended that the invention be unduly limited by this disclosure of a preferred embodiment. Instead, it is intended that the invention be defined by the means, and their obvious equivalents, set forth in the following claims.

What is claimed is:

1. A monitoring circuit to detect changes in a sensed condition which comprises:
    (1) a constant voltage source;
    (2) a voltage divider in circuit therewith to develop at least three reference, constant voltage signals of distinct and predetermined values at each of at least three reference voltage terminals,
    (3) sensor circuit means to generate a condition responsive voltage signal of predetermined value for each of at least four conditions at a sensor voltage terminal;
    (4) at least three voltage comparator means, each having an output terminal and a pair of inputs, one in circuit to a respective one of said reference voltage terminals and the other to said sensor voltage terminal; and
    (5) at least two output circuit means including respective indicators, one indicator in circuit to the output terminal of two of said voltage comparator means and the remaining indicators each in circuit to respective single output the output terminal of a respective one of the remaining voltage comparator means.

2. The monitoring circuit of claim 1, wherein said indicators are light emitting diodes.

3. The monitoring circuit of claim 2 wherein said sensor circuit means comprises condition sensing means to generate zero and maximum voltage signals in response to open and shorted conditions of said sensor circuit means and first and second intermediate sensor voltage signals in response to predetermined, different conditions.

4. The monitoring circuit of claim 3 wherein one of said voltage comparator means receives at its inverting terminal a reference voltage signal exceeding said first and second intermediate sensor voltage signals whereby said comparator means generates an output signal only in response to a shorted condition in said sensor circuit means.

5. The monitoring circuit of claim 4 wherein a second one of said voltage comparator means receives at its noninverting terminal a reference voltage signal of a value below the first and second intermediate sensor voltage signals whereby said second comparator means generates an output signal only in response to an open lead in said circuit.

6. The monitoring circuit of claim 5 wherein a third one of said voltage comparator means receives at its noninverting terminal a reference voltage signal of a value between said first and second intermediate sensor voltage signals whereby said third comparator means generates an output signal in response to an open lead in said circuit and to one of said sensed conditions.

7. The monitoring circuit of claim 1 wherein said sensor circuit means comprises reference and probe capacitors in circuit to a charging power supply and to sensor voltage comparator means operative to generate an output signal when said test capacitor has a predetermined capacitance value.

8. The monitoring circuit of claim 7 wherein said sensor circuit comprises first and second parallel resistances of different values in circuit with a load resistance of fixed value with switch means responsive to said voltage comparator means in circuit with one of said parallel resistances.

9. A test circuit for monitoring a plurality of liquid levels of a vehicle which includes a plurality of the monitoring circuits of claim 7.

10. The test circuit of claim 1 wherein said constant voltage source is a battery and said monitoring circuit also includes a fourth voltage comparator receiving a fourth reference voltage from said voltage divider and receiving an input voltage signal from said battery with an output circuit and indicator in circuit thereto to indicate a satisfactory battery voltage.

* * * * *